Aug. 21, 1962 E. H. SOMMERFIELD 3,050,636

HIGH SPEED TRANSISTOR SWITCH

Filed Aug. 24, 1960

INVENTOR
EDWARD H. SOMMERFIELD

BY G. R. Gugger
AGENT

United States Patent Office 3,050,636

Patented Aug. 21, 1962

3,050,636

HIGH SPEED TRANSISTOR SWITCH

Edward H. Sommerfield, Endicott, N.Y., assignor to International Business Machines Corporation, New York, N.Y., a corporation of New York Filed Aug. 24, 1960, Ser. No. 51,573
5 Claims. (Cl. 307—88.5)

This invention relates to a switching circuit and more particularly to a non-saturating constant voltage transistor switch which provides a low impedance rapid switch action.

In present day computer circuits, use is made of transistor switches to discharge a storage capacitor through the read-in winding of a magnetic switch core. A typical application would be the driving of a magnetic core shifting register. For the most efficient transfer of the capacitor energy to the core, a very rapid turn-on of the switch transistor is required. Since the currents that this switch must pass are in the order of 1 to 2 amperes, and the current gain at these collector currents decreases rapidly, a large amount of overdrive becomes mandatory. Unfortunately these large overdrive requirements prevent rapid turn-off of the switch which is so necessary for high speed operation. In the present improved circuit, the capacitor voltage serves as the collector return potential of the switch transistor and by sampling the collector current the circuit supplies the overdrive only during the turn-on period when it is necessary and supplies minimum necessary drive at turn-off time thus enabling a rapid turn-off.

Accordingly, an object of the present invention is to provide a non-saturating constant voltage transistor switch which provides a low impedance rapid switch action.

A further object of the present invention is to provide an improved low impedance switch for discharging a storage capacitor.

A still further object of the present invention is to provide a switch as in the preceding objects wherein overdrive is supplied only during the period when necessary and minimum drive is supplied at turn-off time.

The foregoing and other objects, features and advantages of the invention will be apparent from the following more particular description of a preferred embodiment of the invention, as illustrated in the accompanying drawings.

Figure 1:
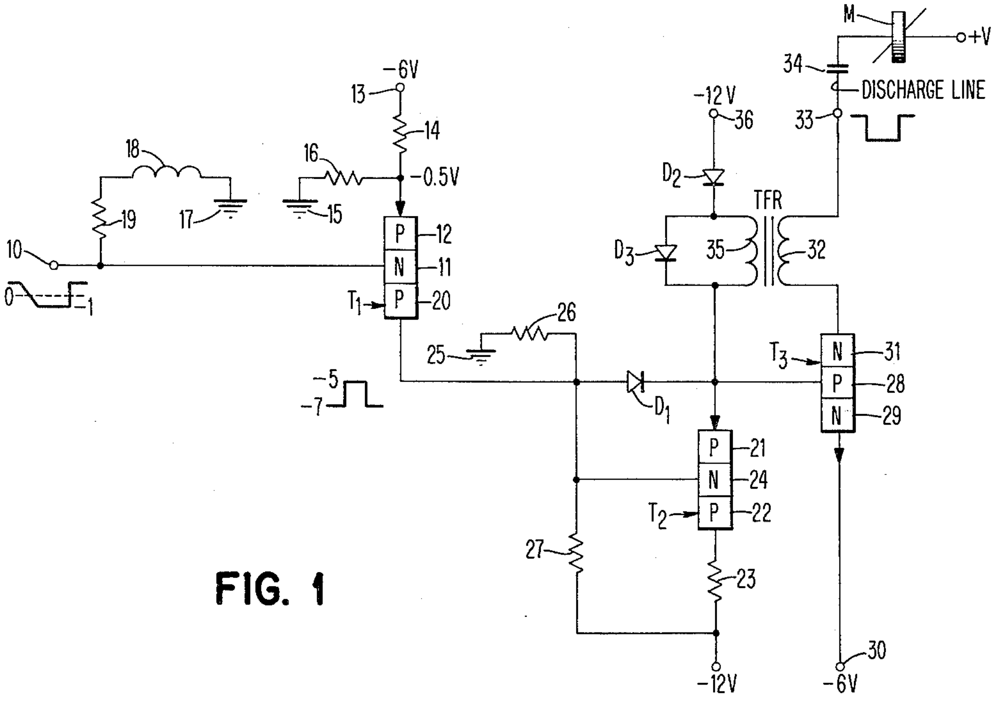
FIG. 1 is a schematic diagram of the device of the invention.

Referring to FIG. 1, an input terminal 10 is shown connected to the base electrode 11 of a PNP type transistor T1. The emitter electrode 12 of transistor T1 is connected to a minus 6 volt terminal 13 by way of resistor 12 and also to a source of ground potential 15 by way of a resistor 16. The emitter resistors 14 and 16 establish a minus .5 volt emitter potential and also limit the current flowing in the transistor to keep the current constant. The base electrode 11 is also connected to a source of ground potential 17 by way of an inductor 18 and resistor 19. The inductor 18 and resistor 19 provide a terminating network for a preceding stage and also a base return for the transistor.

The collector electrode 20 of transistor T1 is connected to the plate of a current sensing germanium diode D1 and the cathode of diode D1 is tied to the emitter electrode 21 of a PNP type transistor T2. The collector electrode 22 of transistor T2 is returned to a source of minus 12 volts by way of a resistor 23 and the base electrode 24 is connected to a biasing network comprising the source of ground potential 25 and the resistors 26, 27. The transistor T2 acts as an emitter follower driver and it will be noted that the base electrode is also connected to the plate of diode D1. In the absence of input current, emitter 21 is forward biased and the transistor conducts heavily to clamp the output voltage to the collector bias. At this time the diode D1 is reverse biased and is nonconducting. Upon application of an input current, diode D1 conducts and cuts off the transistor T2 to pass heavy currents to the load, thereby charging the diode to the input level. When input current ceases, the diode becomes reverse biased and the transistor again conducts and presents an extremely low resistance to the load so that the load may discharge quickly through the transistor to the potential of the collector electrode.

The emitter follower T2 drives an NPN power drift switch transistor T3 whose base electrode 28 is connected to the emitter electrode of emitter follower T2 and to the cathode of diode D1. The emitter electrode 29 of T3 is connected to a minus 6 volt terminal 30 and the collector electrode 31 is connected to one end of the primary winding 32 of a current transformer TFR. The other end of primary winding 32 is connected by way of terminal 33 to a storage capacitor 34 which is to be discharged through the read-in winding of a magnetic switch core M, or the like. In the present circuit, the voltage of capacitor 34 serves as the collector return potential of the switch transistor T3. The secondary winding 35, which is wound in the ratio of 10:1 with respect to the primary, is connected to the emitter circuit of transistor T2 and in feedback relationship with the switch transistor T3. The secondary winding is returned to a minus 12 volt terminal 36 by way of a diode D2 which serves to provide a low impedance path for feedback current to the switch transistor T3. A shunting diode D3 is provided to prevent ringing of a core in the output circuit upon reset.

Figure 2:
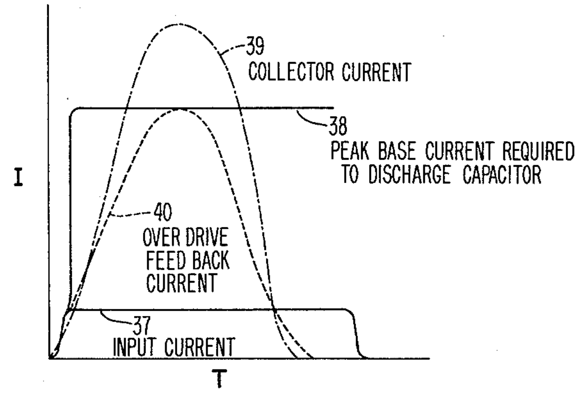
FIG. 2 is a diagram showing the current characteristics of the circuit device shown in FIG. 1.

In the quiescent state, transistor T1 will be biased off, the emitter follower transistor T2 will be biased on and conducting, and the switch transistor T3 will be biased off. Upon the application of a negative going constant current pulse to the input terminal 10, transistor T1 will switch into conduction and the collector current to the germanium diode D1, which has an extremely low resistance at high currents, renders the diode conductive and the emitter follower transistor T2 cuts off. When T2 cuts off, the switch transistor T3 is biased into conduction and the initial base current flow is from the minus 6 volt terminal 30 through diode D1 and transistor T1 to the minus 0.5 volt emitter potential. Referring to FIG. 2, this current flow is illustrated by the curve 37 which represents the input current that is actually supplied to the circuit and it will be noted that this input drive current is kept at a minimum in relation to the peak base current that is required to discharge the capacitor 34 and which is illustrated by the curve 38. As soon as the collector current of transistor T3, which is illustrated by the curve 39 in FIG. 2, picks up by pulling base current, the current transformer TFR is switched on and the current flow in the primary winding 32 induces current flow in the secondary winding 35. The potential at the base of the switch transistor T3 is approximately minus 6 volts and coupled with a 6 volt drop across the secondary winding, the potential at the cathode of diode D2 reaches minus 12 volts and diode D2 becomes conductive. As a result feedback current flows from the minus 12 volt terminal through diode D2 and winding 35 to the base of the switch transistor T3. Referring to FIG. 2, this feedback current flow is illustrated by the curve 40 which represents the current overdrive supplied to the transistor T3 and which, at its peak, reaches the value of the peak base current 38 that is required to discharge the capacitor 34. The output or collector current 39 which discharges the storage capacitor 34, then, is made up of the initial minimum current 37 supplied by the input plus the feedback or overdrive current 40 supplied by the transformer TFR.

As the discharge current of capacitor 34 decreases the feedback current will decrease and after a point, determined by the collector load of transistor T3, the decrease in current in the secondary winding 35 reduces the 6 volt drop and diode D2 cuts off to stop the feedback. Although feedback ceases, conduction of transistor T3 is maintained by current flowing from the collector 20 of the input transistor T1 through the diode D1 to the base of T3. Now an upward swing of the input current pulse to terminal 10 will supply the minimum necessary drive at turn-off time enabling a rapid turn-off. The input transistor T1 will switch off and the emitter 21 becomes forward biased to render transistor T2 conductive. The emitter-base of transistor T2 will rob base current from the switch transistor T3, and feedback current if feedback is present, and this action will drive the switch transistor T3 off. Thus it can be seen that the present circuit, by sampling the collector current of the switch transistor, supplies the overdrive only during the period when necessary and supplies minimum necessary drive at turn-off time.

It will be understood that the storage capacitor 34 may be charged simply by inverting polarities of the voltage supplies and transistors.

While the invention has been particularly shown and described with reference to a preferred embodiment thereof, it will be understood by those skilled in the art that various changes in form and details may be made therein without departing from the spirit and scope of the invention.

What is claimed is:

1. A switching circuit of the class described comprising, a switch transistor having emitter, base and collector electrodes, a storage capacitor in the collector circuit of said transistor, the voltage of said capacitor serving as the collector return potential for said transistor, means for normally biasing said switch transistor off, input circuit means connected to the base of said transistor, means for supplying a constant current pulse to said input circuit means to render said switch transistor conductive whereby minimum collector current is supplied to said capacitor, and feedback circuit means connected between the collector and base of said transistor and effective during conduction of same to provide overdrive feedback current sufficient to discharge said storage capacitor, said capacitor being effective upon discharge to disable said feedback circuit means, said switch transistor being thereafter maintained in normal conduction by said input circuit mean whereby rapid turn-off of said transistor may be effected upon termination of said constant current pulse.

2. A switching circuit of the class described comprising, a switch transistor having emitter, base and collector electrodes, a storage capacitor in the collector circuit of said transistor, the voltage of said capacitor serving as the collector return potential for said transistor, means for normally biasing said switch transistor off, input circuit means connected to the base of said transistor, means for supplying a constant current pulse to said input circuit means to render said switch transistor conductive whereby minimum collector current is supplied to said capacitor, and feedback circuit means including a current transformer having a primary winding connected between said capacitor and collector electrode and a secondary winding connected to said base electrode, said transformer switching during conduction of said transistor to provide overdrive feedback current sufficient to discharge said storage capacitor, said capacitor being effective upon discharge to switch said transformer and disable said feedback circuit means, said switch transistor being thereafter maintained in normal conduction by said input circuit means whereby rapid turn-off of said transistor may be effected upon termination of said constant current pulse.

3. A switching circuit as defined in claim 2 wherein said feedback circuit means includes a source of potential and a diode connected to said secondary winding to provide a low impedance path for the overdrive feedback current.

4. A switching circuit as defined in claim 1 and including an impedance changing circuit connected to the base of said switch transistor and controlled by said input circuit means whereby upon termination of said constant current pulse said impedance changing circuit will rob base current from said switch transistor to drive same off.

5. A switching circuit of the class described comprising, a first, second and third transistor, each of said transistors having emitter, base and collector electrodes, a storage capacitor in the collector circuit of said third transistor, the voltage of said capacitor serving as the collector return potential for said third transistor, means for normally biasing said first transistor off, diode circuit means connecting the collector of said first transistor with the emitter of said second transistor and the base of said third transistor and effective to normally bias said second transistor on and said third transistor off, means for supplying a constant current pulse to the base of said first transistor to render same conductive, said diode circuit means being effective during conduction of said first transistor to switch said second transistor off and said third transistor on, said third transistor supplying minimum collector current to said capacitor, and feedback circuit means including a current transformer connected between the collector and base of said third transistor and effective during conduction of same to provide overdrive feedback current sufficient to discharge said storage capacitor, said capacitor being effective upon discharge to disable said feedback circuit means, said third transistor being thereafter maintained in normal conduction by collector current from said first transistor whereby rapid turn-off of said third transistor may be effected upon termination of said constant current pulse.

References Cited in the file of this patent

UNITED STATES PATENTS

| | | |
|---|---|---|
| 2,878,440 | Jones | Mar. 17, 1959 |
| 2,965,770 | Lewinter | Dec. 20, 1960 |